Dec. 1, 1964                     A. T. KISTER                 3,159,680
       PRODUCTION OF ALPHA, BETA-UNSATURATED ALIPHATIC ALDEHYDES
                        Filed May 29, 1961
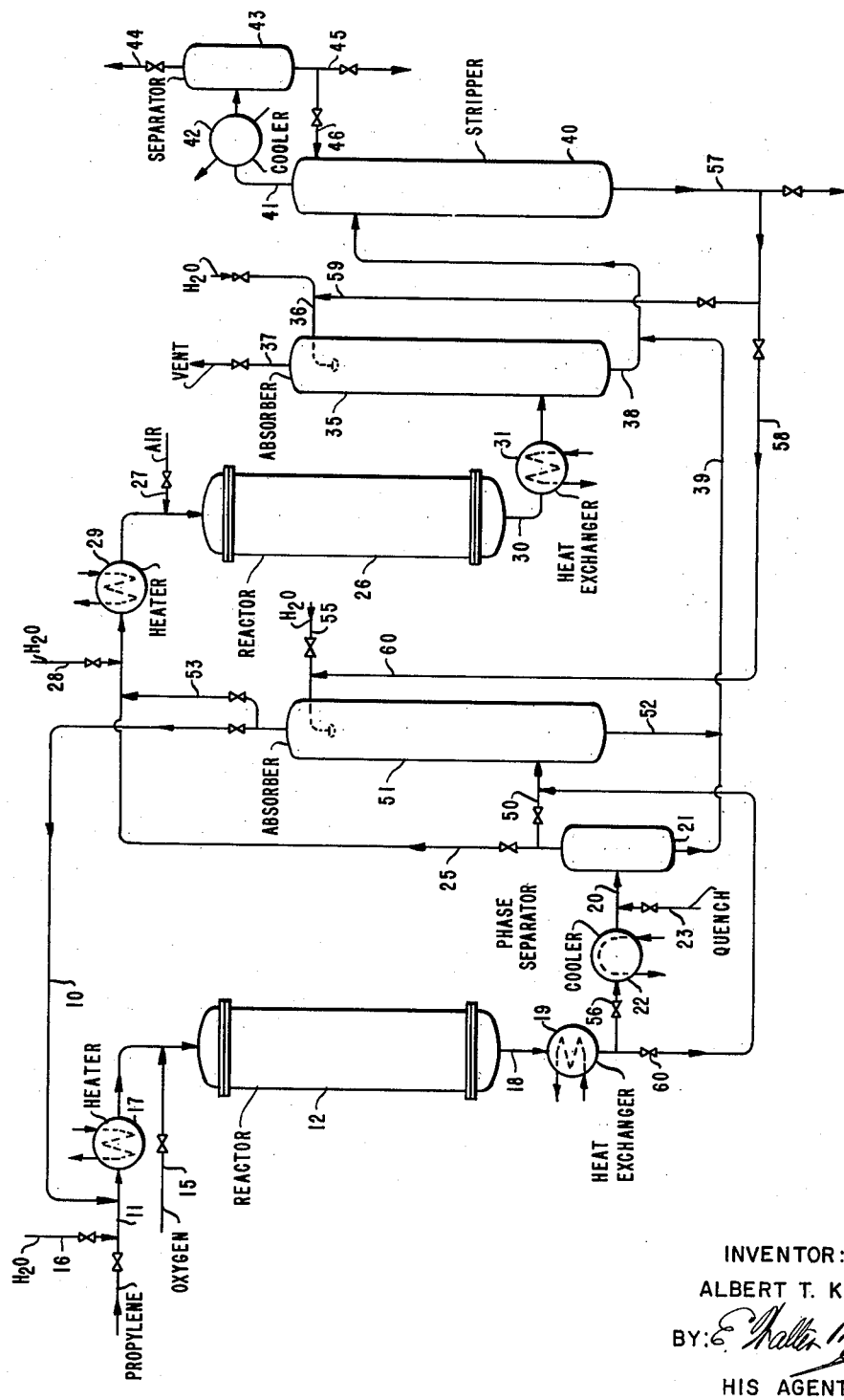
INVENTOR:
ALBERT T. KISTER
BY:
HIS AGENT 3,159,680
PRODUCTION OF ALPHA, BETA-UNSATURATED
ALIPHATIC ALDEHYDES
Albert T. Kister, Albany, Calif., assignor to Shell Oil
Company, New York, N.Y., a corporation of
Delaware
Filed May 29, 1961, Ser. No. 113,233
12 Claims. (Cl. 260—604)

This invention relates to an improvement in the production of alpha,beta-unsaturated aliphatic aldehydes by the catalytic vapor phase oxidation of corresponding olefinic hydrocarbons. The invention relates more particularly to an improvement in the production of acrolein and methacrolein by the vapor phase catalytic oxidation of propylene and isobutylene, respectively.

It is known that the production of the lower alpha, beta-unsaturated aliphatic aldehydes, such as, for example, acrolein and methacrolein, by the oxidation of corresponding olefins, such as propylene and isobutylene, respectively, with molecular oxygen is catalyzed by the presence of certain catalytic materials. It has been indicated heretofore that several types of materials possess some ability to function as catalysts for the reaction. However, only relatively few of these materials are appreciably active at conditions commensurate with practical scale application. Even these generally enable to attainment of their optimum effect only at well defined specific conditions. It is furthermore found that the conditions at which maximum conversion of the olefinic charge is obtained in their presence do not always result in the ultimate production of the desired unsaturated aldehydes at relatively high production rates. Thus, stability of an aldehydic product often varies materially in their presence, not only with temperature but with concentration of the reaction product in the reaction mixture. The effectiveness of a particular catalyst is generally also additionally dependent upon relative composition of the charge to the system. Limiting the concentration of the product, and also of the feed composition, is generally not the solution, however, since this often results in an inordinate increase in unconverted materials unavoidably lost from the system in the vent stream. In processes disclosed heretofore, wherein reliance is had upon the presence of but a single catalyst, it is often exceedingly difficult, if at all possible, to obtain optimum utilization of the feed introduced into the system.

It is, therefore, an object of the present invention to provide an improved process enabling the more efficient catalytic vapor phase oxidation of olefinic hydrocarbons to corresponding alpha,beta-unsaturated aliphatic aldehydes with substantially improved utilization of the olefinic charge.

Another object of the invention is the provision of an improved process enabling the more efficient catalytic vapor phase oxidation of olefins having at least three carbons to alpha,beta-unsaturated aliphatic aldehydes with more efficient utilization of the olefinic charge and with a maximum ultimate recovery of the unsaturated aldehydes formed.

A more particular object of the invention is the provision of an improved process enabling the more efficient catalytic oxidation in the vapor phase of propylene and isobutylene to acrolein and methacrolein, respectively, with substantially improved feed utilization.

It has now been found that alpha,beta-unsaturated aliphatic aldehydes are produced with substantially improved efficiency in the catalyzed controlled vapor phase oxidation of olefinic hydrocarbons with molecular oxygen by effecting said oxidation with the aid of a plurality of specific catalysts employed at conditions conducive to the attainment of optimum efficiency with respect to utilization of the reactants and the stability of the products formed.

In accordance with the invention, an olefinic hydrocarbon in admixture with an oxygen-containing gas is brought into contact with a copper-containing catalyst, at a temperature below about 400° C. and with a relatively low oxygen to propylene ratio in a first reaction zone, and effluence from said first reaction zone is brought into contact with a combination catalyst comprising a combination of (a) a metal selected from the group consisting of bismuth, nickel and cobalt with (b) a metal of the left-hand column of Group VI of the Periodic Table of the Elements and with (c) oxygen, at a temperature above that maintained in the first reaction zone and above about 375° C. and in the presence of a relatively high ratio of oxygen to propylene in a second reaction zone. In one embodiment of the invention, concentrated oxygen having a concentration above about 85% m. is used as the oxygen-containing gas charged to said first reaction zone, and air is used as the oxygen-containing gas charged to said second reaction zone.

In the first reaction zone of the process of the invention the olefinic charge is reacted with oxygen in the presence of a highly active catalyst but at conditions moderating its effect. Suitable catalysts comprise those containing copper, preferably in the form of at least one oxide, as the essential catalytic component. Particularly preferred catalysts comprise those in which copper is present as cuprous oxide during the course of the reaction. The catalysts are generally employed in combination with a suitable catalyst support material which may be inert or which may additionally function as a promoter, or modifier, for the copper component. Examples of suitable catalyst supports are, for example, the aluminous and siliceous materials, silicon, silicon carbide, alumina, etc. Particularly preferred catalysts for use in the first reaction zone of the process comprise those disclosed in U.S. Patents 2,451,485 and 2,847,475. The catalysts may be promoted by the presence therein of promoting amounts of other components. Such promoting materials may be added as such during the preparation of the catalysts or incorporated therewith, for example, as support material. Particularly preferred are the catalyst, including supported and promoted catalysts, described and claimed in U.S. Patent 2,847,475.

In the presence of the highly active copper-containing catalysts the olefinic hydrocarbon charge is converted efficiently to reaction products comprising alpha,beta-unsaturated aliphatic aldehydes. However, in the presence of these highly active catalysts the instability of the unsaturated products tends to increase, not only with increase in temperature but with their relative concentration in the reaction mixture. Conversions may at times be attained at which the rate at which unsaturated aldehydes undergo further reaction approximates and may even exceed the rate at which they are formed. In the process of the present invention, these disadvantages are eliminated to at least a substantial degree by moderating the conditions under which the highly active copper catalyst is employed. This is accomplished by maintaining a relatively low reaction temperature in combination with a limitation upon the ratio of oxygen to olefinic hydrocarbons. The reaction temperature in the first reaction zone is maintained below about 400° C. Generally, temperatures in the range of from about 275 to about 400° C. are employed. The ratio of oxygen to olefinic hydrocarbons introduced into the first reaction zone is controlled to maintain the mole ratio of oxygen to olefins below about 1:1. In general a mol ratio of oxygen to olefinic hydrocarbons in the range of from about 1:2 to about 1:10 in the charge of the first reaction zone is satisfactory. Under these conditions olefins are converted to alpha-beta-unsaturated aliphatic aldehydes with relatively high yield but in the absence of any substantial decomposition of the desired product in the first reaction zone. However, there may thus be imposed a limitation with respect to the extent to which the olefinic hydrocarbon is utilized. The effluence from the first reaction zone will, therefore, often comprise substantial amounts of unconverted olefinic hydrocarbons. Since in practical scale operations a part of the reactor effluence must of necessity be bled from the system to avoid a build-up of undesired materials and also in order to control reaction conditions, the unconverted hydrocarbon content of the bleed represents a loss.

In the process of the present invention effluence from the first reaction zone, comprising unconverted olefinic hydrocarbons, is brought into contact with a specific catalyst, under conditions conducive to maximum conversion of residual olefins to alpha,beta-unsaturated aliphatic aldehydes in a second reaction zone. These conditions within the second reaction zone are obtained by employing a relatively less active oxidation catalyst in said second zone, but at substantially more severe oxidizing conditions than are maintained in said first reaction zone. Suitable catalysts for use in the second reaction zone comprise the combination catalysts consisting essentially of the combination of (a) a metal selected from the group consisting of bismuth, nickel and cobalt, with (b) a metal of the left-hand column of Group VI of the Periodic Table of the Elements, and with (c) oxygen. Preferred are the combination catalysts consisting essentially of a combination of (a) a metal selected from the group consisting of bismuth, nickel and cobalt with (b) tungsten or molybdenum and (c) oxygen. The suitable catalysts may comprise these components in chemical combination with each other, and/or as physical admixtures of the oxides of the metals. Suitable catalysts included in this category comprise those containing the metals in the form of one or more oxides, as heteropoly acids, metallates, or the like. The catalysts may be further modified by the presence of phosphorus, present as the oxide or in chemical combination with the other components. Specific examples of such suitable catalysts are bismuth tungstate, cobalt molybdate, nickel molybdate, bismuth molybdate, bismuth phosphotungstate, bismuth phosphomolybdate, mixtures of the oxides of molybdenum and nickel and/or cobalt, bismuth arsinophosphomolybdate, bismuth arsenophosphotungstate, bismuth arsenomolybdate, cobalt tungstate, nickel tungstate, mixtures of two or more thereof, etc. The catalysts are employed as such or in combination with any sutiable catalyst support such as, for example, the siliceous and aluminous supports, silica gel, the aluminas, silicon, silicon carbide, and the like.

Preferred catalysts for use in the second reaction zone of the process are those consisting essentially of an oxide of bismuth in combination with an oxide of a metal of the left-hand column Group VI of the Periodic Table of the Elements and the bismuth salts of tungstic acid and of molybdic acid. Particularly preferred are the catalysts comprising bismuth, oxygen and a Group VI metal wherein the atomic ratio of bismuth to the Group VI metal lies between about one to 25 atoms of bismuth per 10 atoms of the Group VI metal. The catalysts may be modified by the incorporation therewith of modifying agents such as, for example, phosphorus, arsenic, antimony, tellurium, selenium. These may be present as such, in the form of their oxides, or may be present in chemical combination with the other components.

The relatively more severe conditions of oxidation are obtained within said second reaction zone by the use of a relatively high temperature in combination with a relatively high concentration of oxygen relative to olefinic hydrocarbon in the charge to said second reaction zone. Thus, the temperature within said second reaction zone is maintained above that maintained in the first reaction zone and above about 375° C. Temperatures in the range of from about 375° C. to about 500° C. are generally found to be satisfactory. Important in maintaining the desired conditions within said second reaction zone is the control of the oxygen-containing gas supplied thereto. Thus, the mol ratio of oxygen to olefinic hydrocarbon in the charge to said second reaction zone is generally maintained above about 1:1. In general, the maintenance of the mole ratio of oxygen to olefinic hydrocarbon in the range of from about 1:1 to about 10:1 in the charge to said second reaction zone is satisfactory.

Under these conditions the olefinic hydrocarbon content in the charge to the second reaction zone is converted to unsaturated carbonylics comprising alpha,beta-unsaturated aliphatic aldehydes with high yield and in the absence of any substantial decomposition of aldehydic reaction products, notwithstanding the severity of the oxidizing conditions. This is made possible in the present invention as a result of the finding that the relative rate at which the olefinic hydrocarbons are converted to unsaturated aldehydic products will generally exceed that at which said aldehydic products undergo further reaction under the conditions employed therein.

High conversion of the residual olefinic hydrocarbons, now possible in the second reaction zone of the process, enables all of the off-gas from said second reaction zone to be eliminated from the system without the need for any recovery of components therefrom. In one embodiment of the invention, all material to be vented from the system is comprised in the materials charged to said second reaction zone. Thereby not only minimizing loss of olefinic reactants but greatly reducing the overall cost of product recovery operations to be carried out within the system.

In a preferred embodiment of the invention concentrated oxygen, for example, oxygen-containing gas having an oxygen content above about 85% by volume, is used as the source of the oxygen reactant in the first reaction zone of the process, and air is used as the source of oxygen reactant in the second reaction zone of the process. The invention thus provides a highly economical means enabling a substantial reduction in volume of gases to be handled within the system, reducing still further the cost of product separation. The use of air as the source of the oxygen reactant for the second reaction zone is particularly advantageous in this system because the off-gas from the second reaction zone may be rejected from the system in its entirety without any substantial loss of unconverted hydrocarbons and/or aldehydic product.

The process of the invention is applied broadly to the conversion of monoolefins, particularly those having from three to ten carbon atoms to the molecule, to reaction products comprising unsaturated carbonylic components. It is applied with particular advantage to the reaction of propylene and isobutylene with molecular oxygen to produce acrolein and methacrolein, respectively. Olefins charged need not necessarily be pure but may comprise admixed therewith components such as paraffinic hydrocarbons normally encountered in such olefins as commercially available. Suitable olefinic charge to the process comprises the hydrocarbon fractions, such as, for example, the $C_3$ and $C_4$ olefinic hydrocarbon fractions obtainable in the processing and refining of petroleum products.

For the purpose of clarity, the invention will be described hereinafter in detail in its application to the production of acrolein from propylene, with reference to the attached drawing wherein the single figure represents a more or less diagrammatic, elevational view of one form of apparatus suitable for carrying out the invention.

Referring to the drawing: propylene emanating from an outside source, and/or recycled from within the system, through line 10, is forced through valved line 11 into a first reaction zone comprising, for example, a tubular reactor 12. An oxygen-containing gas such as, for example, concentrated oxygen having an oxygen concentration of at least about 85% is introduced into the system through valved line 15 leading into line 11. Water is introduced into the system as required by means of valved line 16 leading into feed line 11.

Within reactor 12 the admixed propylene and oxygen are brought into contact with a suitable copper-containing catalyst such as, for example, cuprous oxide upon a suitable support such as, for example, silicon carbide. The rate at which propylene and oxygen are introduced into reactor 12 is controlled to maintain the mol ratio of oxygen to propylene in the charge entering reactor 12 below about 1:1, for example, in the range of from about 1:1 to about 1:10, and preferably from about 1:2 to about 1:8. The temperature within reactor 12 is maintained in the range of from about 275 to about 400° C., and preferably from about 300 to about 390°, still more preferably from about 325 to about 375° C. The desired temperature is maintained within reactor 12 with the aid of suitable heating means such as, for example, heater 17 positioned in feed line 11 and optionally with other suitable means not shown in the drawing for adding heat to or withdrawing heat from, the contents thereof.

Under these conditions propylene is reacted with oxygen in reactor 12 with the formation of reaction products comprising acrolein in the absence of any substantial amount of acrolein decomposition. Effluence from reactor 12, comprising acrolein in admixture with unconverted propylene, inert gas, water vapor and oxides of carbon, is passed from reactor 12, through valved lines 18 and 20 into a suitable accumulating zone such as, for example, a chamber 21. Effluence leaving reactor 12 is cooled by passage through heat exchanger 19, positioned in line 18, and is thereafter preferably further cooled by passage through cooling means, such as a cooler 22 positioned in line 20. Still further cooling of the reactor effluent may be accomplished by the addition of a suitable quenching medium such as, for example, water through valved line 23 leading into line 20. Cooling of the stream flowing through line 20 is preferably controlled to effect the condensation of at least a substantial part of the carbonylic reaction products comprising acrolein and water. Within chamber 21 a liquid phase, comprising carbonylic reaction products including acrolein, and water is separated from a vapor phase comprising unconverted propylene, acrolein, water vapor, oxides of carbon, nitrogen and a small amount of paraffins.

Vapor phase is taken from chamber 21 and passed, through valved line 25, into a second reaction zone comprising, for example, a tubular reactor 26. A controlled amount of oxygen-containing gas, preferably air, is introduced into the system by means of valved line 27 leading into line 25. The rate at which air is so introduced into the system through valved line 27 is controlled to result in a mol ratio of oxygen to propylene above about 1:1, preferably from about 1:1 to about 10:1, and still more preferably from about 2:1 to about 5:1, in the mixture entering reactor 26 through line 25. Water is introduced into the system through valved line 28 leading into line 25.

Within reactor 26 the reaction mixture comprising propylene and oxygen is brought into contact with a combination catalyst consisting essentially of a combination of (a) a metal selected from the group consisting of Ni, Co and Bi, with (b) a metal from the left-hand column of Group VI of the Periodic Table of the Elements, and (c) oxygen. Such suitable catalysts comprise bismuth tungstate, bismuthmolybdate, etc, as indicated above. The temperature within reactor 26 is maintained above that prevailing in reactor 12 and above 375° C., for example, in the range of from about 375 to about 500° C., preferably from about 400 to about 475° C. The suitable temperatures within reactor 26 are obtained with the aid of a heater 29, and optionally with additional means, not shown in the drawing, for the addition of heat to, or withdrawal of heat from, reactor 26.

Under these conditions propylene is reacted with oxygen in reactor 26 with the formation of reaction products comprising acrolein in the absence of any substantial acrolein decomposition.

Effluence from reactor 26 comprising acrolein-containing carbonylic reaction products, inert gas and water vapor and containing no substantial amount of unconverted propylene is passed therefrom, through line 30 provided with cooling means, for example, a heat exchanger 31, into a suitable product separating zone comprising absorber 35. Within absorber 35 the effluence from reactor 26 is contacted with a suitable absorbing medium, for example, water, introduced into the top of absorber column 35 by means of line 36. Reaction products including acrolein are selectively absorbed in the water leaving a vapor phase consisting essentially of inert gases containing no substantial amount of unconverted olefins. The vapor phase so separated within absorber 35 is taken therefrom through valved line 37 and eliminated from the system.

Rich absorbate, consisting essentially of water and carbonylic reaction products comprising acrolein, is passed from absorber column 35 through line 38 into a stripping zone, for example, stripping column 40. Liquid phase separated in chamber 21 and consisting essentially of carbonylic reaction products comprising acrolein, is passed from chamber 21 through valved line 39 into line 38 discharging into stripping column 40.

Within column 40 a vapor phase, consisting essentially of carbonylic reaction products comprising acrolein, is separated from a liquid phase consisting essentially of water. Vapor phase is taken from stripper 40 through line 41 provided with cooler 42 and passed into accumulator 43 provided with a gas vent 44. From accumulator 43, liquid phase, consisting essentially of carbonylic products comprising acrolein, is taken therefrom through valved line 45 and eliminated from the system as final product. A part of the stream flowing through line 45 is by-passed through line 46 into the top of stripper 40 as reflux.

In one embodiment of the invention a part of the vapor phase separated in accumulator 21, consisting essentially of inert gas, unconverted hydrocarbons comprising propylene, water and carbonylic reaction products comprising acrolein, flowing through line 25, is by-passed through valved line 50 into an absorption zone comprising, for example, absorption column 51. When operating in this wise, the proportion of vapor phase continuing through line 25 into reactor 26 is maintained sufficiently large to include all material which must need to be vented as bleed from the system. Within absorber 51 effluence from reactor 12 is contacted with a suitable absorbing medium such as, for example, water introduced into the top of the absorber through line 55, to effect the selective absorption of carbonylic reaction products comprising acrolein in the water, leaving a vapor phase consisting essentially of inert gas, hydrocarbons comprising unconverted propylene, and a minor amount of acrolein.

Rich absorbate, comprising water and acrolein, is taken from absorber 51 through line 52, and passed into line 39 wherein it is mingled with the liquid phase taken from accumulator 21. The resulting mixture continues into line 38 leading to stripping column 40.

Vapor phase is taken from absorber 51 through valved line 10 and recycled to feed line 11 leading into reactor 12. A part of the stream so recycled through line 10 is by-passed through valved line 53 leading into line 25 bringing charge to reactor 26.

In a further embodiment of the invention at least a part, or all, of the effluent stream leaving reactor 12 through line 18, may, by judicious control of valves 56 and 60 be made to by-pass accumulator 21 and enter line 50 leading directly into absorber 51.

Liquid phase formed in stripping column 40, consisting essentially of water, is taken therefrom through valved line 57 and recycled in part or entirety to either absorption column 35 or 51, or both, by means of valved lines 58, 59 and 60.

Materials capable of modifying the behavior of the catalyst such as, for example, halogens arsenic, selenium, tellurium, as such or as compounds thereof, may be introduced into reactor 12 and/or 26 during the course of the process. Addition of suitable modifying agents may be resorted to to aid in maintaining the desired conditions in the respective reaction zones.

The process of the invention thus provides a system enabling the production of acrolein by the reaction of propylene with oxygen under conditions providing for a maximum utilization of the propylene charged, with a minimum of acrolein decomposition, with a minimum of operative steps, and with a maximum degree of freedom with respect to operational procedure.

It is to be understood that the invention is in no wise limited with regard to the specific type of apparatus employed as first and second reaction zones of the process. These reaction zones, depicted in the drawing by tubular reactors 12 and 26, respectively, may comprise one or more zones of restricted cross-sectional area, such as, coils, tubular reactors, and the like, or may comprise one or more reactors of enlarged cross-sectional area in which the catalyst is positioned as suitable stationary beds. The first and/or second reaction zone of the process may, furthermore, comprise the use of the respective catalyst in the form of a dense suspended phase, a fluidized system, or the like.

For the purpose of simplicity all part of apparatus not essential to a complete and full understanding of the invention such as, for example, valves, tanks, pumps, heat exchangers, and the like, have been omitted from the drawing.

*Example*

Acrolein is produced by the reaction of propylene with oxygen in a two reactor system wherein make-up oxygen, having a concentration of 95% m., and make-up propylene of 96% m. purity, are continuously added in equimolar proportions to a recycle stream emanating from within the system resulting in an admixture containing 22% m. propylene, 5.4% m. oxygen, 47.5% m. water, the rest of the mixture consisting essentially of inert gases comprising nitrogen, oxides of carbon and paraffinic hydrocarbons. The resulting admixture is introduced continuously into a first tubular reactor wherein it is contacted with a silicon carbide supported cuprous oxide catalyst at a temperature of about 350° C., at a pressure of about 100 p.s.i.g. Effluence from the first reactor is subjected to product separation procedure comprising cooling to effect the separation of a liquid fraction from a gaseous fraction. A liquid fraction containing 4.5% m. of acrolein is thus separated from the effluent stream from the first reactor (the rest of said liquid phase consisted predominantly of water containing a small proportion of carbonylics other than acrolein). The remainder of the effluence from the first reactor remaining in vapor phase is split into two separate streams; one comprising about 90% of the total vapor phase separated from the first reactor effluence and the smaller stream comprising the remaining 10%. The larger of the two streams so obtained is recycled to the first reactor and constitutes the recycle stream above referred to, to which the make-up propylene and make-up concentrated oxygen are added. The smaller of the two streams separated from the vapor phase obtained from the effluence from the first reactor is combined with make-up oxygen in the form of air to result in an admixture containing 5.5% m. of propylene, 10.1% m. of oxygen and 38.5% m. of water the rest consisting essentially of inert gases comprising nitrogen, oxides of carbon and a small proportion of carbonylics comprising acrolein. The resulting admixture so obtained is introduced into a second reactor wherein it is contacted with a catalyst consisting essentially of bismuth molybdate at a temperature of about 465° C. and a pressure of about 90 p.s.i.g. Effluence from the second reactor is scrubbed with water to separate acrolein-containing carbonylic products therefrom. The remaining gas is found to contain only 1.5% m. of propylene and no detectable amount of acrolein and to consist essentially of inert gases comprising nitrogen, some paraffins, and oxides of carbon. The rich absorbate obtained by scrubbing the effluence from the second reactor and the liquid phase recovered from the effluence of the first reactor are combined and fractionated to recover the acrolein therefrom. There is thus obtained a yield of 69% of acrolein in the first reactor for every 100 moles of propylene consumed and a yield of 70% m. of acrolein for a propylene conversion of 85% m. in the second reaction zone. An overall propylene utilization of 95% m. is obtained in the operation.

Similarly methacrolein is produced by reacting isobutylene with oxygen in the presence of the above-defined catalysts under the conditions set forth herein.

I claim as my invention.

1. The process for the production of unsaturated carbonylic reaction products comprising lower alpha, beta-unsaturated aliphatic aldehydes, which comprises contacting an olefin having from three to ten carbon atoms to the molecule and an oxygen-containing gas, in a mol ratio of oxygen to said olefin below about 1, with a copper-containing catalyst, at a temperature of from about 275 to about 400° C., in a first reaction zone, adding oxygen-containing gas to unconverted olefin-containing effluence from said first reaction zone in the controlled amount resulting in the formation of an admixture containing a mol ratio of oxygen to olefinic hydrocarbons above about 1, and contacting the resulting admixture with a combination catalyst consisting essentially of the combination of (*a*) a metal selected from the group consisting of bismuth, cobalt and nickel with (*b*) a metal from the left hand column of Group VI of the Periodic Table of the Elements and with (*c*) oxygen in a second reaction zone, at a temperature which is above that maintained in said first reaction zone and which is in the range of from about 375 to about 500° C., thereby reacting olefins with oxygen with the formation of carbonylic reaction products comprising lower alpha, beta-unsaturated aliphatic aldehydes in said reaction zones.

2. The process in accordance with claim 1 wherein said olefin and said oxygen are contacted with said copper-containing catalyst in said first reaction zone as a mixture containing a mol ratio of oxygen to said olefin in the range of from about 1:2 to about 1:10, and wherein said oxygen-containing gas is added to said olefin-containing effluence from said first reaction zone in an amount resulting in a mol ratio of oxygen to olefin in the range of from about 1:1 to about 10:1 in said resulting admixture contacted with said combination catalyst in said second reaction zone.

3. The process for the production of unsaturated carbonylic reaction product comprising lower alpha, beta-unsaturated aliphatic aldehydes, which comprises contacting olefinic hydrocarbons having from three to about ten carbon atoms to the molecule and oxygen-containing gas in a mol ratio of oxygen to said olefinic hydrocarbons in the range of from about 1:2 to about 1:10 with a cuprous oxide catalyst, at a temperature of from about 300 to about 390° C. in a first reaction zone, adding an oxygen-containing gas to unconverted olefinic hydrocarbon-containing effluence from said first reaction zone in the controlled amount resulting in the formation of an admixture containing a mol ratio of oxygen to olefinic hydrocarbons in the range of from about 1:1 to about 10:1 and contacting said resulting admixture with a combination catalyst consisting essentially of the combination of (a) a metal selected from the group consisting of bismuth, nickel and cobalt with (b) a metal from the left hand column of Group VI of the Periodic Table of the Elements and with (c) oxygen in a second reaction zone, at a temperature of from about 400 to about 475° C., thereby reacting said olefins with oxygen with the formation of unsaturated carbonylic reaction products comprising alpha, beta-unsaturated aliphatic aldehydes in said reaction zones.

4. The process in accordance with claim 3, wherein said combination catalyst in said second reaction zone consists essentially of bismuth molybdate.

5. The process for the production of unsaturated carbonylic reaction products comprising lower alpha, beta-unsaturated aliphatic aldehydes which comprises contacting olefinic hydrocarbons having from three to ten carbon atoms to the molecule and an oxygen-containing gas in a mol ratio of oxygen to said olefinic hydrocarbon in the range of from about 1:2 to about 1:10 with a copper catalyst, at a temperature of from about 300 to about 390° C. in a first reaction zone, separating olefin-containing effluence emanating from said first reaction zone into two separate olefinic streams of unequal volume, adding concentrated oxygen having a purity above about 85% as make-up oxygen to the smaller of said olefinic streams and recycling the resulting admixture to said first reaction zone, adding air to the larger of said olefinic hydrocarbon streams in the controlled amount resulting in the formation of an admixture containing a mol ratio of oxygen to olefinic hydrocarbons in the range of from about 1:1 to about 10:1 and contacting said resulting admixture with a combination catalyst consisting essentially of the combination of (a) a metal selected from the group consisting of bismuth, nickel and cobalt with (b) a metal from the left hand column of Group VI of the Periodic Table of the Elements and with (c) oxygen in a second reaction zone, at a temperature of from about 400 to about 475° C., thereby reacting said olefins with oxygen with the formation of unsaturated carbonylic reaction products comprising alpha,beta-unsaturated aliphatic aldehydes in said reaction zones.

6. The process for the production of acrolein which comprises contacting an admixture of propylene and oxygen containing a mol ratio of oxygen to propylene below about 1 with a copper-containing catalyst at a temperature of from about 275 to about 400° C. in a first reaction zone, adding oxygen-containing gas to unconverted propylene-containing effluence from said first reaction zone in the controlled amount resulting in an admixture containing a mol ratio of oxygen to propylene above about 1, and contacting the resulting admixture with a catalyst consisting essentially of a combination of (a) a metal selected from the group consisting of bismuth, nickel and cobalt with (b) a metal from the left hand column of Group VI of the Periodic Table of the Elements and with (c) oxygen in a second reaction zone at a temperature which is higher than that obtaining in said first reaction zone and which is in the range of from about 375 to about 500° C., thereby reacting propylene with oxygen in said reaction zones with the formation of reaction products comprising acrolein.

7. The process for the production of acrolein which comprises contacting an admixture of propylene and oxygen containing a mol ratio of oxygen to propylene in the range of from about 1:2 to about 1:10 with a copper containing-catalyst, at a temperature of from about 300° to about 390° C. in a first reaction zone, adding oxygen-containing gas to unconverted propylene-containing effluence from said first reaction zone in the controlled amount resulting in an admixture containing a mol ratio of oxygen to propylene in the range of from about 1:1 to about 10:1, and contacting the resulting admixture with a catalyst consisting essentially of a combination of (a) a metal selected from the group consisting of bismuth, nickel and cobalt with (b) a metal from the left-hand column of Group VI of the Periodic Table of the Elements and with (c) oxygen, in a second reaction zone, at a temperature of from about 400 to about 475° C., thereby reacting propylene with oxygen in said reaction zones with the formation of reaction products comprising acrolein.

8. The process in accordance with claim 7 wherein said copper-containing catalyst consists essentially of a cuprous oxide catalyst.

9. The process in accordance with claim 8 wherein said combination catalyst in said second reaction zone consists essentially of a bismuth molybdate catalyst.

10. The process for the production of acrolein which comprises contacting an admixture of propylene and oxygen containing a mol ratio of oxygen to propylene in the range of from about 1:2 to about 1:10 with a cuprous oxide catalyst, at a temperature of from about 300 to about 390° C. in a first reaction zone, adding air to unconverted propylene-containing effluence from said first reaction zone in the controlled amount resulting an admixture containing a mol ratio of oxygen to propylene in the range of from about 1:1 to about 10:1, and contacting the resulting admixture with a catalyst consisting essentially of a bismuth molybdate catalyst in a second reaction zone at a temperature which is higher than that maintained in said first reaction zone but which is in the range of from about 375 to about 500° C., thereby reacting propylene with oxygen in said reaction zones with the formation of reaction products comprising acrolein.

11. The process for the production of acrolein which comprises contacting an admixture of propylene and oxygen containing a mol ratio of oxygen to propylene in the range of from about 1:2 to about 1:10 with a copper-containing catalyst, at a temperature of from about 275 to about 400° C. in a first reaction zone, separating propylene-containing effluence emanating from said first reaction zone into two separate streams of unequal volume, adding concentrated oxygen having a purity above about 85% to the smaller of said propylene-containing streams and recycling the resulting admixture to said first reaction zone, adding air to the larger of said propylene-containing streams in the controlled amount resulting in an admixture containing a mol ratio of oxygen to propylene in the range of from about 1:1 to about 10:1, and contacting the resulting admixture with a catalyst consisting essentially of a combination of (a) a metal selected from the group consisting of bismuth, nickel and cobalt with (b) a metal from the left-hand column of Group VI of the Periodic Table of the Elements and with (c) oxygen in a second reaction zone at a temperature which is higher than that in said first reaction zone and which is in the range of from about 375 to about 500° C., thereby reacting propylene with oxygen in said reaction zones with the formation of reaction products comprising acrolein.

12. The process for the production of methacrolein which comprises contacting isobutylene and oxygen, in a mol ratio of oxygen to isobutylene below about 1, with a copper oxide catalyst, at a temperature of from about 275 to about 400° C. in a first reaction zone, adding oxygen-containing gas to unconverted isobutylene-containing effluence from said first reaction zone in the controlled amount resulting in an admixture containing a mol ratio of oxygen to isobutylene above about 1, and contacting said resulting admixture with a bismuth molybdate catalyst in a second reaction zone at a temperature above that maintained in said first reaction zone and in the range of from about 375 to about 400° C., thereby reacting isobutylene with oxygen in said reaction zones with the formation of reaction products comprising methacrolein.

References Cited by the Examiner

UNITED STATES PATENTS

| 2,941,007 | 6/60 | Callahan et al. | 260—604 |
| 2,990,427 | 6/61 | Caldwell | 260—604 |
| 3,009,943 | 11/61 | Hadley et al. | 260—604 |

FOREIGN PATENTS

| 678,557 | 9/52 | Great Britain. |
| 694,354 | 7/53 | Great Britain. |
| 507,347 | 11/54 | Canada. |

LEON ZITVER, *Primary Examiner.*

CHARLES B. PARKER, *Examiner.*